Sept. 25, 1962

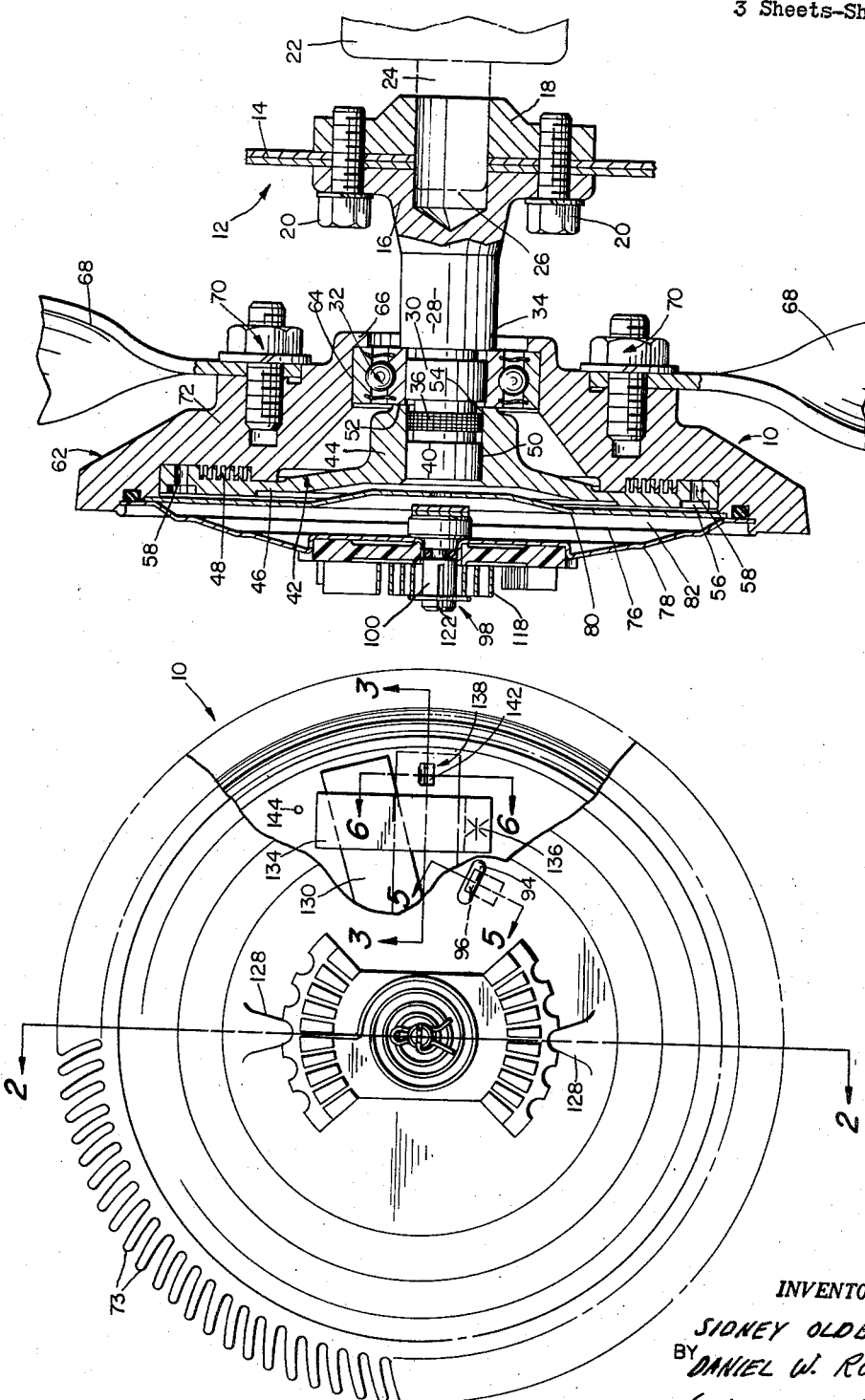

S. OLDBERG ET AL 3,055,473

FLUID COUPLING DEVICE

Filed May 11, 1959

INVENTORS
SIDNEY OLDBERG
BY DANIEL W. ROPER

ATTORNEYS

Sept. 25, 1962   S. OLDBERG ET AL   3,055,473
FLUID COUPLING DEVICE
Filed May 11, 1959   3 Sheets-Sheet 3

INVENTORS
SIDNEY OLDBERG
BY DANIEL W. ROPER
ATTORNEYS

United States Patent Office 3,055,473
Patented Sept. 25, 1962

3,055,473
FLUID COUPLING DEVICE
Sidney Oldberg, Birmingham, and Daniel W. Roper, Rochester, Mich., assignors to Eaton Manufacturing Company, Cleveland, Ohio, a corporation of Ohio
Filed May 11, 1959, Ser. No. 812,479
21 Claims. (Cl. 192—58)

This invention relates to a torque transmitting mechanism and more particularly to a thermostatically controlled driving device wherein energy is transmitted from one member to the other through a fluid medium. This device is disclosed in the particular embodiment of a vehicle accessory drive wherein the driven accessory functions as a selectively operable cooling means responsive to the cooling requirements of the prime mover. Vehicle cooling fan devices are generally belt driven from the engine crankshaft and in most conventional applications, are operable at a fixed speed ratio with respect to the vehicle engine. It has been found desirable to increase the speed ratio of the fan with respect to the engine speed so that at low engine r.p.m., the fan will be running at relatively high speed for maximum cooling and as the speed of the engine increases, such as when the vehicle is running in direct drive at road speeds, the ram air cooling effect on the radiator and engine is increased and the necessity for fan cooling is decreased.

In order to accomplish this functional purpose, two-speed fan drives have been provided utilizing either a change speed friction drive or a change speed gear type transmission. These devices have proven to be too costly and complicated to merit their use and are also objectionable from the standpoint that at the intermediate speeds, the fan is either running too fast or too slow with respect to engine speed.

The novel device disclosed herein relates to an engine cooling fan mechanism wherein a fluid viscous shear type clutch is utilized to transmit driving torque from a vehicle engine to the fan structure. A viscous shear type clutch utilizing silicone fluid as the fluid means is especially adapted for this use because the driven member has a speed characteristic of leveling off to a constant speed regardless of an increase in speed of the input member. In other words, at low engine speeds, the fan is driven at a relatively fixed ratio with respect to the speed of the engine but as the speed increases, the fan speed falls off to practically a constant speed, regardless of increase in engine speed. Such a device has the inherent advantageous feature of operating throughout the low and intermediate ranges at a fan speed which is most desirable and then leveling off at high engine speed to a design speed level which is most practical for the particular engine to be cooled. It is to be understood that the novel structure disclosed herein is not limited in application to a vehicle fan drive but is also useable in any application wherein the torque transmission characteristics of a viscous drive are required along with means to disengage the coupling.

The novel device disclosed herein contemplates the improvement of a viscous shear type cooling fan structure by utilizing a new and novel thermostatically operated fan disconnect means so that when the temperature in the engine compartment falls below a predetermined value, the thermostatically operated means functions to disconnect the fan drive so that no energy is absorbed by the fan means since adequate cooling is provided externally by either an increase in ram air or a decrease in the outside temperature.

It is an object of this invention to provide a new and novel temperature responsive selectively engageable fluid shear type driving means.

Another object of this invention is to provide a fluid shear type engine accessory wherein the driven element speed is at all times maintained at a desired angular velocity with respect to the angular velocity of the driving means.

Still another object is to provide a temperature responsive, evacuation type, selectively engageable fluid shear driving means.

Another object is to provide an accessory driving device of the evacuation type wherein the fluid operating chamber can be partially evacuated in response to an external temperature change so that the speed differential between the driving and driven elements is increased due to the decrease in quantity of operating fluid.

A further object is to provide an accessory driving device which has no wearing torque transmitting surfaces and which is quiet and efficient in operation.

Still another object is to provide a novel adjusting means to select the proper temperature at which the operating fluid is wholly or partially evacuated from the operating chamber of a fluid shear drive.

A further object is to provide a fluid evacuating means for exchanging fluid from the operating chamber to the storage chamber of a fluid shear drive and vice versa without the utilization of any separate pumping means.

Yet another object is to provide a novel evacuation means wherein only a single movable valve means is needed to effect the novel operation of partially or completely evacuating the operating chamber.

These and other objects and advantages of the invention will appear from the following description taken in connection with the drawings forming a part of the specification and in which:

FIGURE 1 is a partial plan cutaway of a novel, thermostatically operated, fluid energy torque transmitting means.

FIGURE 2 is a partial sectional view taken on 2—2 of FIGURE 1.

Figure 3:
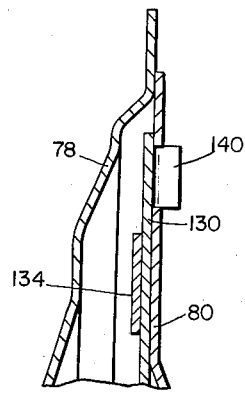
FIGURE 3 is a cross-sectional view taken on 3—3 of FIGURE 1.

Briefly, this invention is comprised of a pulley or sheave which is fixed for rotation with a coupling input shaft and mounted in cantilever fashion on an appropriate engine projecting support or mounting means. The aforementioned pulley is adapted to be driven, preferably by a belt, from the vehicle crankshaft. The coupling input shaft has fixed for rotation therewith a coupling member or driving clutch member and a coupling body or housing member is mounted for rotation with respect to the input shaft by a suitable anti-friction bearing and substantially encloses the driving clutch member. Fluid viscous shear surfaces are disposed in cooperative relationship on the coupling body member and the driving clutch member and define a fluid operating chamber. A combination cover and fluid storage assembly means is fixed for rotation with the housing member and is formed of two plate portions which define a fluid storage chamber axially adjacent the viscous shear surfaces on the driving clutch member and the coupling body member, respectively. A valve structure is comprised of valve openings disposed in one of the aforementioned plates and a valve controlling mechanism is mounted on the other of said plates. A thermostat means is also mounted on the last mentioned plate to operate the valve so that when the valve is open or partially open, fluid in the storage chamber is transferred to the operating chamber defined by the viscous shear surfaces and therefore, upon rotation of the input shaft means, torque is transmitted from the driving clutch member to the coupling body member through fluid viscous shear. When the valve mechanism is closed in response to movement of the thermostatic operator, fluid flows through the discharge opening from the operating chamber back into the storage chamber. The detailed function of the valve mechanism will be hereinafter described in greater detail. Since the fluid medium has been removed from between the viscous shear surfaces, torque can no longer be transmitted from the driving clutch member to the body member and therefore, no power is absorbed by the cooling fan structure.

Referring to the drawing for a more detailed description of this device, FIGURE 1 discloses an engine accessory, fluid operated coupling means 10 and an accessory driving structure 12 comprising a pulley or sheave 14 connected to a shaft flange portion 16 and a companion hub plate 18 by bolts 20. An engine block supported member 22 has connected thereto a stub mounting shaft 24 which is mounted by a force or press fit integral with companion plate 18. As shown, the unsupported end of stub mounting shaft 24 extends into an annular opening 26 in the shaft flange portion 16 and shaft 24 is free to rotate relative to member 22. Pulley 14 is suitably driven by a belt from the vehicle engine (not shown) so that when the engine is in operation, the pulley functions as a driving input means for engine accessory fluid operated coupling means 10.

Figure 11:
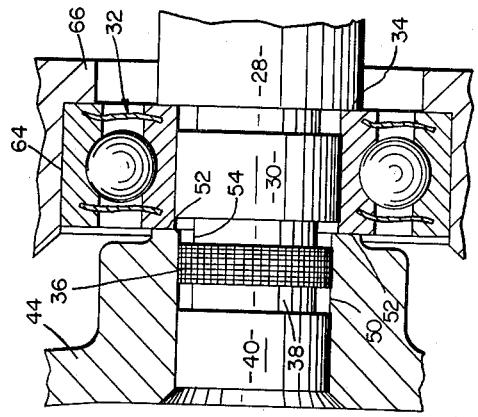
FIGURE 11 is an enlarged view of a portion of the structure shown in FIGURE 2.

The coupling means 10 is comprised of a driving shaft means 28 integral with shaft flange portion 16. Referring to FIGURES 2 and 11, shaft 28 is provided with a reduced intermediate portion 30 which functions as an inner race supporting means for ball bearing assembly 32. A shoulder 34 formed on shaft 28 restrains ball bearing 32 in one axial direction. A further shaft portion 36 is provided with surface serrations and a reduced diameter shaft portion 38 connects a further shaft portion 40 to the aforementioned portion of shaft 28.

A coupling member or clutch driving member 42 is provided with a hub portion 44 and a flange or plate portion 46 having a plurality of concentric, annular coupling lands 48 formed on the back side of flange portion 46. Hub portion 44 is provided with a straight wall hub opening 50 which has an interference fit with shaft portion 40 and knurled portion 36 so that when hub portion 44 is pressed or forced onto shaft portions 36 and 40, driving clutch member 42 will rotate with and be axially retained on shaft means 28. Hub portion 44 is pressed onto the shaft and bearing assembly until thrust surface portion 52 of hub portion 44 abuts the inner race of bearing assembly 32 to axially confine the bearing assembly in the other direction of axial movement. Shaft 24 is undercut at 54 to insure abutment between thrust surface 52 of hub 44 and the end surface of the inner race of bearing assembly 32.

Driving clutch member 42 is provided with an annular recess 56 formed in a face of plate portion 46 on the side opposite annular lands 48. A pair of diametrically opposed, axially directed holes 58 are disposed slightly radially outward of annular lands 48 and terminate in annular recess 56. Annular lands 48 terminate, or alternatively, are cut away in the form of a V notch to form a pair of diametrically opposed, radially directed channels or slots 60 which are circumferentially coincident with holes 58 and in communication with the holes. This structure defines ducting or a fluid path commencing with the area adjacent annular lands 48, radial channels or slots 60, axially directed holes 58 and annular recess 56. The function of this structural arrangement will be hereinafter discussed more specifically.

A coupling body or housing member 62 is comprised of a hub surface portion 64 which is supported on the lateral surface portion of the outer race of ball bearing assembly 32 and disposed in an interference fit therewith. A lip or shoulder portion 66 reacts against an end surface of the outer race of bearing assembly 32 and limits or axially restrains housing member 62 in one axial direction. A plurality of fan blades 68 are secured at the shank portion of the blades by stud and nut assemblies 70 to radially intermediate body portion 72 of housing member 62.

Figure 7:
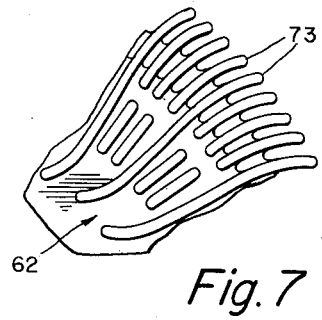
FIGURE 7 shows a portion of the finned cooling structure of the housing shown in FIGURES 1 and 2.
Figure 8:
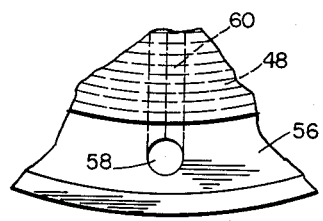
FIGURE 8 is a plan view of a portion of the structure shown in FIGURE 4.

Referring to FIGURES 1, 2 and 7, cooling fins 73 are formed on the outer surface portion of coupling member 62 on the surface of the coupling disposed adjacent fan blades 68. These cooling fins are arranged to provide additional cooling area to dissipate heat which is generated in the viscous coupling which will hereinafter be described in greater detail.

Figure 4:
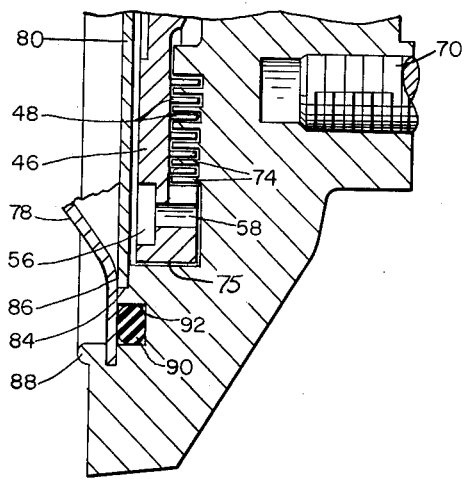
FIGURE 4 is an enlarged view of a portion of the structure shown in FIGURE 2.

A plurality of concentric, annular lands 74 are disposed in an axial direction and formed integral with coupling body member 62 and in assembly, are positioned in an axially overlapping relationship with annular coupling lands 48 of driving clutch member 42 so that the grooves disposed between the lands of one of the members receives the lands of the other member and vice versa, to form a fluid operating chamber between the lands. The aforementioned coupling grooves are disposed in a position so that when oil or other viscous fluid means, or more specifically, silicone oil is disposed between lands 48 and 74, torque can be transmitted from one member to the other by fluid shear. It has been found satisfactory to provide a radial clearance between lands 48 and 74 in a range of about .005 to .010 inch. However, this clearance is not extremely critical and is a function of the inherent characteristics of the shear fluid which is utilized. Referring to FIGURES 2 and 4, the peripheral surface of driving member 42 is slightly radially spaced from the adjacent wall surface of housing member 62 at 75. During operation, housing member 62 is supported by bearing assembly 32 and fluid in the operating chamber and space 75, as disclosed in our U.S. patent application Serial No. 680,241, filed August 26, 1957, now U.S. Patent No. 2,948,268.

A combination cover and fluid storage assembly means 76 is comprised of an exterior or cover plate 78 and a valve or pump plate 80 disposed axially intermediate cover plate 78 and coupling member 42. Cover plate 78 and valve plate 80 cooperate to define a fluid storage chamber 82. Valve plate 80 is receivable in an annular notched recess 84 provided in coupling body member 62 to laterally confine the valve plate. Cover plate 78 abuts the periphery of valve plate 80 along an annular surface 86 and thus valve plate 80 is axially confined in both directions and restrained laterally by annular notched recess 84. The peripheral portion of cover plate 78 is fixed integrally with coupling body member 62 by an annular spun-over portion 88. The cover plate could otherwise be retained in position with respect to coupling body member 62 by staking or by a snap ring located at the illustrated position of portion 88. An O ring 90 disposed in an annular recess 92 functions to retain the coupling fluid within the operating assembly and to prevent any leakage of the fluid.

Figure 5:
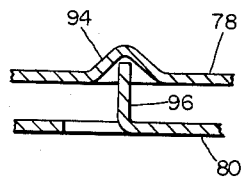
FIGURE 5 is a cross-sectional view taken on 5—5 of FIGURE 1.
Figure 10:
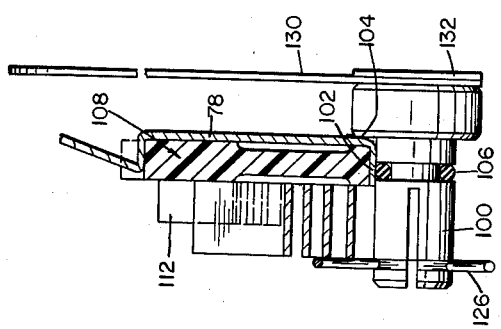
FIGURE 10 is a cross-sectional view taken on 10—10 of FIGURE 9 with the valve means illustrated and rotated 90° from the position shown in FIGURE 1.
Figure 9:
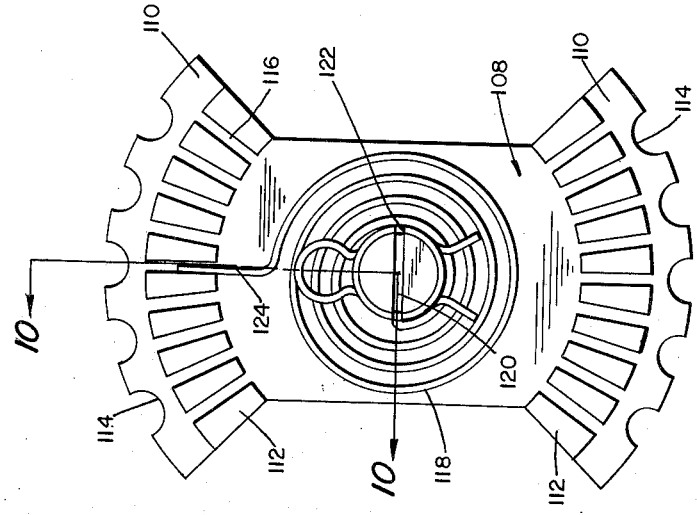
FIGURE 9 is an enlarged view of the thermostatic adjusting means shown in FIGURE 1.

Referring to FIGURES 1 and 5, a dimple or recessed portion 94 is formed in cover plate 78 in a shape to receive a locking tab 96 which is formed from an outturned portion of valve plate 80 and receivable in dimple 94 to lock cover plate 78 from relative rotation with respect to valve plate 80. Referring to FIGURES 2 and 10, a valve and valve control assembly 98 is comprised of a valve and valve control mounting shaft 100 and is supported in a flanged hub portion 102 of cover plate 78. The inboard end of the shaft is of a greater diameter than the outboard end and the shoulder formed thereby abuts hub portion 102 of cover plate 78 at 104. A sealing O ring 106 is disposed in an annular groove and functions as a fluid seal to prevent leakage of fluid from storage chamber 76. The assembly of shaft 100 in hub portion 102 of cover plate 78 is of a fit such that shaft 100 rotates free in hub 102 and it is preferable that shaft 100 be rotatable in the hub with a maximum input torque of 1″ oz. The amount of drag which is tolerable in this assembly is of course a function of the torque input of the thermostatic control to be hereinafter described but it has been found that a practical maximum of 1″ oz. torque input to rotate the shaft is desirable.

An adjustment plate 108 is comprised of a pair of diametrically opposed notch adjustment bars 110 and a plurality of opposed slot adjustment bars 112 mounted axially adjacent and integral with notch adjustment bars 110. A plurality of equally spaced, peripherally disposed, arcuate notched openings 114 are provided in notch adjustment bars 110 and a plurality of equally spaced, radially disposed slots 116 are disposed between slot adjustment bars 112. Adjustment plate 108 comprising notch adjustment bars 110 and slot adjustment bars 112 is preferably molded in one piece of a suitable plastic material.

A helically wound, bi-metallic temperature differential responsive, thermostatic element 118 is provided with an in-turned end portion 120 which is receivable in a transverse slot 122 disposed in shaft 100. An out-turned end portion 124 is selectively receivable in any one of the slots 116. A spring retainer clip 126 is receivable in a suitable annular groove provided in shaft 100 to axially confine bi-metallic element 118 in an axial direction away from cover plate 78. With this arrangement, all of the parts are axially and laterally confined so that all parts are maintained in the desired assembled position. It is to be noted that slot adjustment bar 112 disposed on the side opposite out-turned end portion 124 has no operative function. Adjustment plate 108 is formed with a group of opposed slot adjustment bars 112 so that the bi-metallic element 118 can be inserted in assembled relationship with shaft 100 in either position. Obviously, bi-metallic element 118 could be assembled so that out-turned end portion 124 would be disposed downwardly instead of in an upward direction as illustrated in FIGURE 10.

A pair of diametrically opposed, axially projecting adjustment lock portions 128 are formed in the surface portion of cover plate 78 and formed in a manner to be receivable in said notched openings 114. Adjustment lock portions 128 could be formed as separate elements and integrally connected with cover plate 78 but it has been found that to deform surface portions of cover plate 78 to define these lock portions is a practical expedient. With this arrangement, a new and novel thermostatic adjusting means is provided so that, in effect, a coarse and fine adjustment can be effected since two separate adjusting means are provided; namely, the circumferential position of out-turned end 124 with respect to slot adjustment bars 112 and also, the circumferential position of notch adjustment bars 110 with respect to adjustment lock portions 128. Slots 116 are disposed out of phase with notched openings 114 and the spacing between adjacent notched openings 114 and adjacent slots 116 is determined by the degree of fine adjustment required.

A valve element arm 130 is disposed axially between the end surface of the enlarged portion of shaft 100 and a tab or plate 132 positioned on the opposite side of valve arm 130. Valve arm 130 and tab 132 are suitably connected to shaft 100 by resistance welding so that rotation of shaft 100 results in conjoint rotation of valve arm 130. A valve plate guide or restraining bar 134 is suitably connected as by resistance welding to valve plate 80 at 136. Guide 134 is positioned to prevent movement of valve arm 130 away from valve plate 80.

Figure 6:
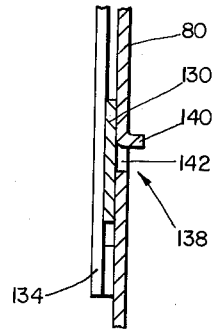
FIGURE 6 is a cross-sectional view taken on 6—6 of FIGURE 1 with the valve means in a closed position.

A fluid inlet valve means 138 is positioned in valve plate 80 at a point slightly radially inward of the outer end of valve arm 130 and radially coincident with annular recess 56 so that in one angular position of valve arm 130, fluid inlet valve means 138 is sealed and completely covered by the valve arm. Fluid inlet valve means 138 is formed by displacing a part of valve plate 80 in the form of an out-turned tab or abutment member 140 which extends into annular recess 56 of coupling member 42 and is disposed in relatively close fitting relationship with recess 56 so that angular movement of tab 140 with respect to recess 56 results in displacement of fluid ahead of tab 140 in the direction of relative rotation. Tab 140 and recess 56 actually cooperate to form an impact type pumping means. Referring to FIGURE 6, tab 140 is positioned on the leading edge of fluid inlet opening 142 when valve plate 80 is rotated. With such an arrangement, a low pressure area is created behind tab 140 and adjacent fluid inlet opening 142 when valve plate 80 is rotating in an upward direction, as viewed in FIGURE 6. When valve arm 130 is circumferentially spaced with respect to fluid inlet opening 142, fluid flow is induced from storage chamber 82 through inlet opening 142 and into annular recess area 56.

A fluid discharge valve means 144 is formed as a punched or stamped opening in valve plate 80 and is circumferentially spaced with respect to inlet valve means 138 and positioned radially coincident with annular recess 56 and inlet valve means 138. Because of the circumferential disposition of discharge valve 144 with respect to tab 140, fluid is pumped ahead of tab 140 creating a higher fluid pressure in recess 56 adjacent valve 144 and thus causing a fluid flow from recess 56 through valve 144 into storage chamber 82.

It is to be noted, however, that the area of discharge 144 is less than that area of inlet opening 142. Therefore, when both openings are uncovered, the inlet rate of fluid flow into recess 56 through opening 142 is greater than the discharge rate of fluid flow into storage chamber 82 through opening 144. Depending on the desired idle speed and the viscosity of the fluid utilized, a ratio of areas in the range of from four to one up to ten to one is desirable.

It can be seen from this arrangement of parts that notch adjustment bar 110 functions as a reaction member for the out-turned end 124 of bi-metallic element 118. When the air temperature surrounding bi-metallic element 118 is raised or lowered, the bi-metallic element will either contract or expand, depending upon whether the temperature increases or decreases. Such expansion or contraction of the bi-metallic elements results in appropriate rotation of valve mounting shaft 100 and angular movement of valve arm 130 to either open or close fluid inlet valve means 138. A suitable stop could be provided to prevent valve arm 130 from moving to a position to cover opening 144, but in the valving arrangement illustrated in FIGURE 1, functional operation is the same when valve arm 130 is in the position shown or in a position wherein valve arm 130 covers opening 144.

It is to be noted that valve arm 130 could be formed of sufficient width (not shown) so that when fluid inlet valve means 138 is opened, discharge valve 144 is covered by arm 130.

With such an alternative arrangement, the area of valve opening 142 with respect to valve opening 144 is not critical because the discharge opening is covered when the inlet opening is uncovered. It is to be noted that the novel structure disclosed herein is structurally arranged so that a fluid support at 75 is provided during coupling operation even when the operating chamber is evacuated. This relationship exists because the annular space at 75 is arranged radially outward of the pumping means constituted by annular recess 56 and tab 140. With this novel arrangement, housing 62 is supported during coupling operation by bearing assembly 32 and the fluid support at 75.

In order to more clearly understand the details of the device, a typical operating cycle is set forth as follows.

When the vehicle engine is in operation, pulley 14 is driven at an appropriate speed ratio, preferably a stepped-up ratio with respect to the speed of the vehicle engine, and shaft 28 along with coupling member 42 is driven at the same speed. It is to be noted that coupling member 42 is driven at all times during engine operation and selective rotation of coupling body member 62 is determined by the presence of fluid in the operating chamber between annular coupling lands 48 and 74. The presence of fluid between the aforementioned coupling lands is determined solely by the position of the valve arm which is in turn controlled by the energization of the bi-metallic thermostatic element. When the temperature of the air surrounding the bi-metallic element 118 is such that fan cooling is required, the bi-metallic element is expanded to move valve arm 130 to the solid line position shown in FIGURE 1.

In this position of the valve arm, inlet opening 142 is uncovered and flow of fluid is induced from storage chamber 82 into annular recess 56 due to the low pressure area which is created behind tab 140 inducing the flow in the direction of annular recess 56. Also, there is a natural flow of fluid from storage chamber 82 into the operating chamber because the fluid seeks approximately the same annular level in each of the chambers except as modified by the action of pump tab 140. As previously mentioned, annular recess 56 is in communication with axially disposed holes 58 and radially directed channels 60. Therefore, when inlet opening 142 is uncovered, fluid flows from storage chamber 82 to the space between coupling lands 48 and 74 to provide a shear fluid effective to transmit torque from coupling member 42 to housing member 62. Since discharge 144 is of less area than inlet 142, the rate of discharge into storage chamber 82 is less than the inlet rate into the operating chamber and the operating chamber therefore remains filled when valve arm 130 uncovers opening 142.

When temperature conditions change such that bi-metallic element 118 is contracted, valve arm 130 is rotated clockwise to the dotted line position, as viewed in FIGURE 1, and depending upon the temperature encountered, the valve will either partially or completely cover fluid inlet opening 142. If inlet opening 142 is completely covered, positive flow of fluid from storage chamber 82 into the space between lands 48 and 74 is prevented. However, since the fluid discharge valve opening 144 is uncovered, fluid will flow from the space between lands 48 and 74 radially outward through radial channels 60, holes 58 and annular recess 56 through opening 144 into the storage chamber due to the pumping effect of tab 140 in recess 56. It is to be noted that the effective pumping action of tab 140 in cooperation with discharge opening 144 is dependent upon the arcuate distance between tab 140 and discharge opening 144. In the environment of the coupling details shown in FIGURE 1, it has been found that the spacing illustrated in FIGURE 1 between tab 140 and discharge opening 144 is satisfactory to produce evacuation of the working chamber when inlet opening 142 is closed.

When a temperature condition is encountered which actuates the bi-metallic means to partially uncover opening 142, an intermediate volume of fluid will be disposed in the working chamber and centrifugal force propels the fluid outwardly. The amount of opening of fluid inlet 142 determines how many of the annular coupling lands are active working lands during such a mode of operation. For example, fluid opening 142 could be uncovered in an amount so that there is only enough fluid in the working chamber to fill the space between the outermost annular lands. Thus, less than one-half of the working area would be transmitting torque through fluid shear from the driving member to the driven member. The sensitivity of intermediate engagement and the temperature range of intermediate engagement is a function of the calibration of the bi-metallic element and the ratio of the areas of the openings 142 and 144. It is to be noted that the alternative valve structure (not shown) previously mentioned, wherein the inlet opening is covered while the discharge opening is uncovered and vice versa, does not necessarily provide an intermediate torque transmitting capacity determined by the amount of fluid in the operating chamber.

If, after initial operating runs, it is determined that the fan is not operating sufficiently long to maintain the engine temperature at a low enough level, then the spring retainer clip 126 is removed and the out-turned end 124 of bi-metallic element 118 is adjusted to a different slot 116, or adjustment plate 108 can be moved axially with respect to adjustment lock portions 128 and rotated so that a different notched opening 114 is received in the adjustment lock portions after reassembly. Spring retainer clip 126 is then repositioned in the shaft recess. It is obvious that adjustment can be effected in a rapid and efficient manner and by the provision of the coarse and fine adjustment, it is possible to obtain fan operation which commences at any desired temperature.

While the present invention has been described in connection with certain specific embodiments, it is to be understood that the foregoing description is merely exemplary and that the concept of this invention is susceptible of numerous other modifications, variations, and applications which will be apparent to persons skilled in the art.

We claim:

1. A torque transmitting device comprising a first member, a second member rotatable relative to said first member and disposed adjacent said first member to define an operating chamber between said members, a fluid storage chamber adjacent said operating chamber, valve means effecting selective communication between said storage chamber and said operating chamber, temperature responsive means controlling said valve means, means comprising an operating chamber discharge opening for fluid flow communication between said chambers and being carried by one of said members, fluid means disposed in said storage chamber and being selectively displaced into said operating chamber when said valve means is in a fluid communication condition whereby said fluid is positioned in said operating chamber to transmit energy through said fluid from one of said members to the other of said members and pump means comprising an impeller element carried by said one of said members and a pump housing cooperable with said impeller element and carried by the other of said members and being effective to pump fluid from said operating chamber to said storage chamber.

2. A fluid shear torque transmitting device comprising a shaft means, a body member rotatably supported axially on said shaft means, a coupling member fixed for rotation with said shaft means and disposed adjacent said body member, cooperating fluid shear surfaces formed on said body member and said coupling member, a combination cover and fluid storage means disposed adjacent said coupling member and axially on the opposite side of said coupling member from said body member, said cover and fluid storage means being carried by and connected for rotation with said body member and comprising a cover plate, temperature responsive valve means mounted on said cover plate, a valve plate disposed axially between said cover plate and said coupling member and cooperating with said cover plate to define a fluid storage chamber, a fluid inlet opening disposed in said valve plate, a fluid discharge opening disposed in said valve plate and spaced from said fluid inlet opening, said temperature responsive valve means comprising a valve mounting shaft rotatably mounted in said cover plate, a valve arm fixed for rotation with said mounting shaft and extending radially in said storage chamber to selectively seal said fluid inlet opening, a thermostatic element disposed externally of said cover plate and selectively rotatably energizing said mounting shaft in response to predetermined temperature variations in the vicinity of said thermostatic element, fluid means disposed in said storage chamber between said shear surfaces whereby when said coupling member is rotated by said shaft means, said body member is rotated through fluid shear when said fluid storage chamber is in communication with said shear surfaces through said inlet opening, and fluid being evacuated from between said shear surfaces into said storage chamber when said valve arm closes said fluid inlet opening.

3. A thermostat adjusting means for a temperature responsive torque transmitting device comprising a notched adjustment plate, means supporting said adjustment plate, said adjustment plate being selectively rotatably positioned with respect to said supporting means, means integral with said supporting means comprising projections cooperating with a set of a plurality of sets of notched portions on said adjustment plate for holding said adjustment plate in a desired angular position with respect to said supporting means, a temperature differential responsive element having an end portion selectively angularly positioned with respect to said adjustment plate, means comprising a plurality of adjusting slots on said adjustment plate to hold said end portion of said element, an actuated member cooperatively disposed with said supporting means, a remote portion of said temperature differential responsive element connected to said actuated member whereby the actuated position of said actuated member with respect to said adjustment plate can be selectively adjusted by the positioning of said adjustment plate with respect to said supporting means and by the angular positioning of said end portion of said temperature differential responsive element with respect to said adjustment plate.

4. A rotatable torque transmitting device comprising an input member, an output member encompassing said input member and being supported thereon, a fluid operating chamber formed between said input and said output member, spaced plate means adjacent said members and defining a fluid storage chamber between said plate means, fluid means disposed in said storage chamber, a bidirectional pumping fluid flow inducing pump means carried by said plate means to pump fluid from said storage chamber to said operating chamber, and selectively operable valve assembly means disposed in said plate means to permit flow of said fluid means from said storage chamber to said operating chamber whereby said output member is driven by said input member through said fluid means upon rotation of said input member, a fluid discharge opening cooperating with said bidirectional fluid flow inducing pump to pump fluid from said operating chamber to said storage chamber and said fluid discharge opening being substantially circumferentially aligned with said pump.

5. A torque transmitting device comprising a first member, a second member rotatable relative to said first member and being supported thereon, shear surfaces disposed on said first member and said second member and forming an operating chamber therebetween, a fluid storage chamber adjacent said operating chamber, valve means effecting selective communication between said storage chamber and said operating chamber, temperature responsive means controlling said valve means, pump means comprising a recess portion formed in one of said members and an axially projecting means fixed for rotation with the other of said members and being disposed in said recess, means comprising a pump discharge opening in said other of said members, fluid means disposed in said storage chamber and being selectively displaced to either said storage chamber or said operating chamber by said pump means whereby said members are either rotatably disconnected or drivingly connected through said fluid means.

6. In a drive mechanism wherein an output member is to be driven from an input member whose speed is variable in a continuous manner through low and high speed ranges, said drive mechanism comprising a first rotatable member, a second rotatable member disposed for rotation about the axis of said first rotatable member and having portions extending on opposite sides of said first rotatable member to define a fluid chamber enclosing the outer periphery of at least a part of said first rotatable member, fluid means within said chamber, said rotatable members having spaced opposing surfaces cooperating with each other and with said fluid means to provide a shear type fluid drive between said rotatable members, a fluid storage chamber disposed adjacent said first member and forming an operative part of said second member, valve means effecting selective communication between said fluid storage chamber and said spaced opposing surfaces, pump means comprising a first element rotatable with one of said members, an adjacent annular surface portion rotatable with the other of said members, a pump discharge opening means disposed in said one member, and said pump being operative to pump said fluid means to either said fluid storage chamber or between said spaced opposing surfaces, whereby said members are either rotatably disconnected or drivingly connected through said fluid means.

7. A drive mechanism for driving an engine fan from an engine, said mechanism comprising a first member defining a fluid chamber, a single bearing mount rotatably supporting said member and comprising anti-friction bearing means, a shaft coaxial with axis of rotation of said member and extending into said chamber, a drive clutch member disposed within said chamber coaxially with said shaft and connected to said shaft for rotation therewith, fluid means within said chamber, said chamber and said clutch member having adjacent shear surfaces cooperating with said fluid means to form a fluid shear coupling, pump means comprising a first part rotatable with said storage chamber and a second part rotatable with said driving clutch member to selectively pump fluid to either said storage chamber or said adjacent shear surfaces, means defining a fluid bearing including said fluid means and further adjacent portions of said storage chamber and said driving clutch member disposed radially outward of said pump means to provide a supporting volume of fluid between said driving clutch member and said storage chamber during rotation of said driving clutch member, and valve means to allow selective flow of said fluid means to either said storage chamber or between said adjacent shear surfaces.

8. An engine fan drive for an engine, comprising a shaft driven from said engine, a driving clutch member connected to said shaft for rotation therewith, a combination housing and storage chamber means defining a fluid storage chamber adjacent said driving clutch member, a single anti-friction bearing mount rotatably supporting said combination housing and storage chamber means on said shaft, said housing and said driving clutch having closely spaced shear surfaces disposed thereon, fluid means within said storage chamber, pump means to selectively displace said fluid to the space between said shear surfaces or to said storage chamber, means defining a fluid bearing including said fluid means and portions of said driving clutch member and said housing respectively, disposed radially outward of said shear surfaces, said fluid bearing means being at all times filled with said fluid means to provide a fluid bearing means to cooperate with said single anti-friction bearing mount for supporting said combination housing and storage chamber means.

9. A fluid coupling comprising a first rotatable member, a second rotatable member having portions extending on opposite sides of said first rotatable member and encompassing at least the outer periphery of a portion of said first rotatable member, fluid means within said chamber, said members being coaxial and one of said members being supported by a single bearing mount comprising anti-friction bearing means and said members having spaced opposed surfaces cooperating with said fluid means to provide a shear type fluid coupling to rotate said one of said members upon rotation of the other of said members, said second rotatable member including a fluid storage chamber fixed for rotation therewith, a pump means having a portion rotatable with said first member and a further portion rotatable with said second member, said pump means being operative to selectively displace said fluid means to either the area between said spaced opposed surface or to said storage chamber, means defining a fluid bearing including said fluid means and further adjacent surfaces on said first member and said second member respectively, and disposed radially outward of said spaced opposed surfaces and said pump means to form a fluid bearing whereby said housing member is supported by said single bearing mount and said fluid bearing.

10. A fluid coupling comprising a first rotatable member, a second rotatable member coaxially disposed with respect to said first rotatable member and having a storage chamber portion on one side of said first member and a housing portion on the opposite side of said first member, fluid means within said chamber, pump means disposed between said first rotatable member and said storage chamber to selectively displace said fluid means from said storage chamber to a position between said first rotatable member and said housing portion, one of said members being supported by a single bearing mount, a fluid bearing comprising said fluid means and adjacent portions of said rotatable members arranged radially outward of said pump means and cooperating with said single bearing mount to support said second rotatable member.

11. A fluid drive shear coupling comprising a shaft, a member having a fluid storage chamber and a fluid operating chamber therein coaxial with said shaft, a coupling member cooperating with said first mentioned member to form said operating chamber, a single bearing mount supporting said first mentioned member for rotation relative to said shaft, fluid means disposed in said storage chamber, said coupling member being connected to said shaft for rotation therewith, said operating chamber comprising external walls disposed adjacent the outer peripheral portion of said coupling member and internal walls disposed on said first mentioned member and cooperating to provide a shear type fluid drive between said coupling member and said first mentioned member, and pumping means disposed between said coupling member and said first mentioned member to displace said fluid means selectively to either said operating chamber or said storage chamber, and further adjacent surfaces on said coupling member and said first mentioned member and disposed radially outward of said cooperating portions which form a shear type fluid drive and also disposed radially outward of said pump means to form a fluid bearing whereby said first mentioned member is supported by said single bearing mount and said fluid bearing.

12. A device according to claim 11 wherein said pumping means is comprised of an annular recessed portion formed in said coupling member, axially projecting means mounted on said first mentioned member and axially projecting into said recessed portion.

13. A device according to claim 12 wherein valve means is mounted on said fluid storage chamber and is selectively operable to allow displacement of fluid from one of said chambers to the other by said pumping means.

14. A device according to claim 13 wherein thermostatic means is mounted externally on said coupling, and means connecting said thermostatic means and said valve means.

15. A device according to claim 14 wherein said thermostatic means is a spirally wound bi-metallic element.

16. A fluid shear torque transmitting device comprising a first rotatable member, a second member concentric with and rotatable relative to said first member, means including said members defining a fluid operating chamber, means defining a fluid storage chamber independent of said operating chamber, valve means controlling fluid communication between said storage chamber and said operating chamber, means in said operating chamber including coacting surfaces disposed on each of said members respectively, for transmitting torque by fluid shear from one of said members to the other of said members, pump means comprising a fluid abutment member disposed in said operating chamber and fixed for conjoint rotation with said fluid storage chamber means, means comprising a pump discharge opening fixed at all times for conjoint rotation with said abutment member and disposed in fluid pump discharge relation with respect to said abutment member for pumping fluid from said operating chamber to said storage chamber, fluid means selectively displaceable from said fluid storage chamber to said fluid operating chamber through said valve means, and said fluid means being displaceable from said fluid operating chamber to said fluid storage chamber through said pump discharge opening means in response to rotation of said members.

17. A fluid shear torque transmitting device comprising a first rotatable member, a second relatively rotatable member encompassing said first member and being supported thereon, a fluid operating chamber being formed between said members, means comprising a fluid storage chamber adjacent said operating chamber, a fluid supply disposed in said storage chamber, valve means for controlling fluid communication from said storage chamber to said operating chamber, means including closely spaced surfaces disposed on each of said members, respectively, for transmitting torque by fluid shear from one of said members to the other of said members, an impact pump comprising a fluid abutment means in said operating chamber, said abutment means being mounted on said fluid storage chamber means, means comprising an impact pump discharge opening mounted on said fluid storage chamber, said discharge opening means being located ahead of said abutment means in the direction of rotation of said fluid storage chamber and said abutment means producing a positive fluid pressure at said discharge opening means to discharge fluid from said operating chamber to said storage chamber during rotation of said device.

18. A controlled fluid shear type coupling comprising in combination, a pair of coupling members concentrically disposed for relative rotation on a common axis and having confronting portions disposed in axially spaced relation to define a fluid operating chamber therebetween, said confronting portions adapted to coact in shear relation with fluid in the operating chamber to transmit torque from one of said coupling members to the other, a fluid storage chamber disposed adjacent said fluid operating chamber and having operating fluid stored therein, chamber separating means coacting to isolate the fluid storage chamber from the fluid operating chamber, said chamber separating means having spaced apertures therethrough, one of said coupling members adapted to be drivingly rotated to cause operating fluid to be displaced from the storage chamber through one of said apertures into the operating chamber, an impeller means rotatable with said chamber separating means and disposed in pumping relationship with another of said apertures to cause return displacement of fluid from the operating chamber to the storage chamber.

19. In an engine accessory drive comprising a shaft means adapted to be driven by an engine, a housing concentrically supported for rotation on said shaft means, said housing including an intermediate body portion disposed axially on one side of said rotor member, a cover member connected at its periphery to said intermediate body portion and disposed axially on the other side of said rotor member, plate means disposed axially between said rotor member and said cover member, said plate means cooperating with said cover member to form a fluid reservoir chamber therebetween and cooperating with said intermediate body portion to form a fluid operating chamber therebetween, said reservoir chamber having a supply of fluid therein, a rotor member disposed in said fluid operating chamber and connected for rotation with said shaft means, said rotor member and said housing having closely spaced opposed surfaces for transmitting torque therebetween through shear of said fluid, a thermostatically operating valve assembly comprising valve means disposed in said fluid reservoir chamber for controlling fluid communication from said reservoir chamber to said operating chamber, thermostatic means mounted on said cover member exteriorly of said housing, means defining a central opening in said cover member, means disposed through said central opening operatively connecting said thermostatic means and said valve means, means defining a fluid discharge opening between said operating chamber and said reservoir chamber, and means including a fluid abutment member fixed at all times for conjoint rotation with said fluid discharge opening to create a positive fluid pressure at said fluid discharge opening to displace fluid from said operating chamber to said reservoir chamber during rotation of said drive.

20. A device according to claim 19 wherein said valve assembly includes adjustment means to adjust said valve means for correlating valve opening with temperature responsive movement of said thermostatic means.

21. A torque transmitting device comprising a first member, a second member rotatable relative to said first member and being supported thereon, shear surfaces disposed on said first member and said second member and forming an operating chamber therebetween, a fluid storage chamber adjacent said operating chamber, valve means effecting selective communication between said storage chamber and said operating chamber, temperature responsive means controlling said valve means, pump means comprising a recessed portion formed in one of said members and an axially projecting means fixed for rotation with the other of said members and being disposed in said recess, means comprising a pump discharge opening in said other of said members, fluid means being displaceable from said operating chamber to said storage chamber by said pump means during rotation of said device.

References Cited in the file of this patent
UNITED STATES PATENTS

| | | |
|---|---|---|
| 1,373,331 | Hupp | Mar. 29, 1921 |
| 1,659,875 | Jacobs | Feb. 21, 1928 |
| 1,798,431 | McWilliams | Mar. 31, 1931 |
| 2,194,738 | Chace | Mar. 26, 1940 |
| 2,838,244 | Oldberg | June 10, 1958 |
| 2,881,890 | Welch | Apr. 14, 1959 |
| 2,902,127 | Hardy | Sept. 1, 1959 |